United States Patent
Reddy

(10) Patent No.: US 10,351,754 B1
(45) Date of Patent: Jul. 16, 2019

(54) CEMENT COMPOSITIONS COMPRISING AQUEOUS LATEX CONTAINING DISPERSED SOLID AND LIQUID ELASTOMER PHASES

(71) Applicant: Saudi Arabian Oil Company, Dhahran (SA)

(72) Inventor: B. Raghava Reddy, Pearland, TX (US)

(73) Assignee: SAUDI ARABIAN OIL COMPANY (SA)

( * ) Notice: Subject to any disclaimer, the term of this patent is extended or adjusted under 35 U.S.C. 154(b) by 0 days.

(21) Appl. No.: 15/870,374

(22) Filed: Jan. 12, 2018

(51) Int. Cl.
*C09K 8/467* (2006.01)
*C08L 9/10* (2006.01)
*C04B 16/10* (2006.01)

(52) U.S. Cl.
CPC .............. *C09K 8/467* (2013.01); *C04B 16/10* (2013.01); *C08L 9/10* (2013.01)

(58) Field of Classification Search
CPC ..................................................... C09K 8/467
USPC ......................................................... 523/130
See application file for complete search history.

(56) References Cited

U.S. PATENT DOCUMENTS

| | | |
|---|---|---|
| 5,135,577 A | 8/1992 | Brothers |
| 6,111,007 A * | 8/2000 | Rosenbaum .......... C08F 255/04 524/461 |
| 6,516,884 B1 | 2/2003 | Chatterji et al. |
| 6,832,651 B2 | 12/2004 | Ravi et al. |
| 7,143,828 B2 | 12/2006 | Reddy et al. |
| 7,294,194 B2 | 11/2007 | Reddy et al. |
| 7,402,204 B2 | 7/2008 | Le Roy-Delage et al. |
| 7,530,396 B1 | 5/2009 | Reddy et al. |
| 7,645,817 B2 | 1/2010 | Reddy et al. |
| 7,650,940 B2 | 1/2010 | Reddy et al. |
| 7,913,757 B2 | 3/2011 | Reddy et al. |
| 8,240,377 B2 | 8/2012 | Kulakofsky et al. |
| 8,490,707 B2 | 7/2013 | Robisson et al. |
| 9,394,202 B2 | 7/2016 | Porcherie et al. |
| 2002/0033263 A1* | 3/2002 | Chatterji ................ C04B 24/26 166/292 |
| 2011/0077324 A1 | 3/2011 | Ravi et al. |
| 2014/0305646 A1 | 10/2014 | Chew et al. |

* cited by examiner

*Primary Examiner* — Deve E Valdez
(74) *Attorney, Agent, or Firm* — Bracewell LLP; Constance Gall Rhebergen

(57) ABSTRACT

A composition for use as a latex cement additive, the composition comprising an aqueous latex, the aqueous latex comprising an aqueous fluid and a solid elastomer, where the solid elastomer is dispersed in the aqueous fluid; a liquid elastomer, the liquid elastomer having a viscosity between 50,000 cP and 300,000 cP at room temperature; and a surfactant, the surfactant operable to facilitate incorporation of the liquid elastomer into the aqueous latex.

10 Claims, 1 Drawing Sheet

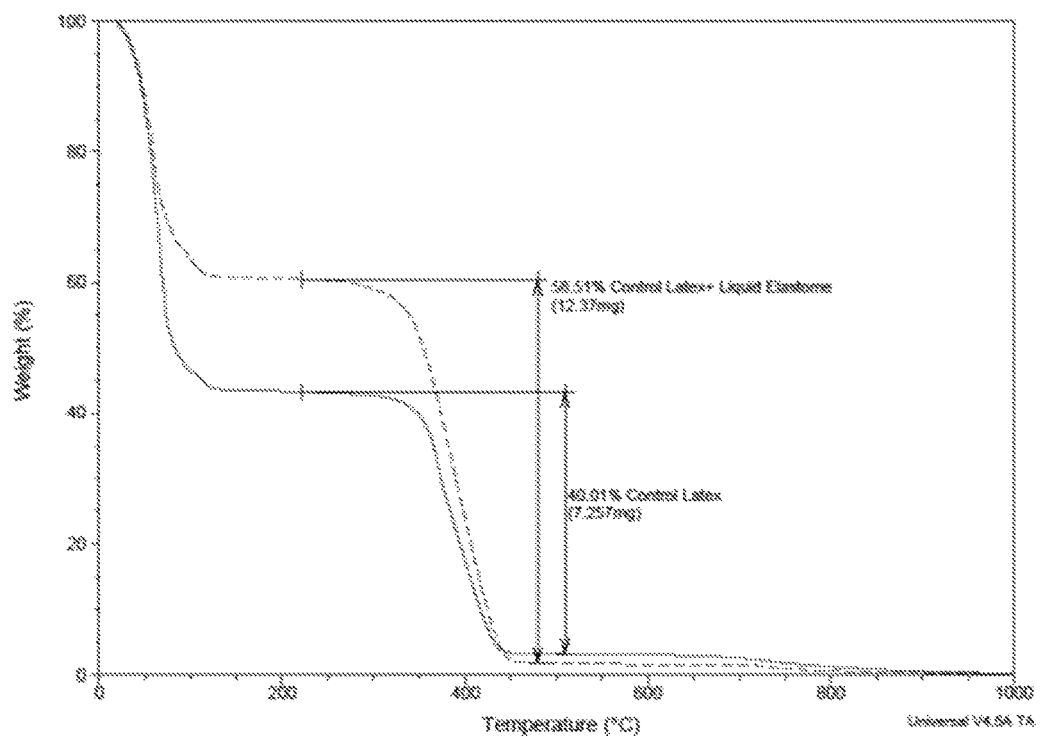

CEMENT COMPOSITIONS COMPRISING AQUEOUS LATEX CONTAINING DISPERSED SOLID AND LIQUID ELASTOMER PHASES

TECHNICAL FIELD

Disclosed are compositions and methods for use with cement. Specifically, disclosed are compositions and methods for enhancing cement properties in a downhole environment.

BACKGROUND

Upon completion of drilling a well, cement slurries are pumped down the hole, and placed in the annulus between a casing pipe and subterranean formation, or between two casing strings. The cement slurry upon setting can isolate the cemented formation zones and can prevent fluid communication (often referred to as zonal isolation) between the cemented zones, or between the formation and the wellbore annulus. However, the cement sheath, during the production phase of the well, is subjected to a variety of stresses from the wellbore side, such as cyclic pressure and temperature changes, fluid density changes, stimulation operations such as perforations, fracturing, acidizing and remedial operations. As a result, the cement may develop cracks and fractures which can provide conductive pathways or channels, through which formation fluids can flow into, accumulate, and build pressure at the well head. Because of the hazards posed by such situations, wells may need to be shut down until successful remedial operations such as squeeze cementing, or settable resin injection are carried out. The success of such remedial operations is not always assured or predictable.

Current approaches to develop cement compositions which are, primarily, resistant to cyclic stresses and sudden impact events during the life of the well, and secondarily to self-heal in case of cracking under stress are complex or only mildly effective. For example, some approaches to improve cyclic stress resistance of cement compositions include using foamed cement slurries, which require highly specialized equipment such as cryogenic equipment to supply nitrogen. Other approaches such as inclusion of particulate elastomers, while representing a simpler solution, suffer from problems such as poor adhesion between cement and liquid elastomer, phase separation in the slurry, or difficulties in obtaining in suitable particle sizes.

SUMMARY

Disclosed are compositions and methods for use in cement slurries. Specifically, disclosed are compositions and methods for controlling a downhole environment during cement operations.

In a first aspect, a composition for use as a latex cement additive is provided. The composition includes an aqueous latex, the aqueous latex includes an aqueous fluid and a solid elastomer dispersed in the aqueous fluid. The composition further includes a liquid elastomer having a viscosity between 50,000 centiPoise (cP) and 300,000 cP at room temperature, and a surfactant operable to facilitate incorporation of the liquid elastomer into the aqueous latex.

In certain aspects, the solid elastomer includes monomers selected from butadiene monomers, styrene monomers, acrylonitrile monomers, ethylene monomers, vinyl acetate monomers, and combinations of the same. In certain aspects, the liquid elastomer includes a low molecular weight polymer, where the low molecular weight polymer includes butadiene. In certain aspects, the low molecular weight polymer includes polar groups selected from the group consisting of polar monomers, polar functional groups, and combinations of the same. In certain aspects, the low molecular weight polymer includes polar monomers selected from the group consisting of acrylonitrile, maleic anhydride, vinyl acetate, and combinations of the same. In certain aspects, the low molecular weight polymer includes the polar functional group selected from the group consisting of carboxylate groups, hydroxyl groups, carboxy anhydride groups, ester groups, sulfonate groups, phosphonate groups, and combinations of the same. In certain aspects, the surfactant is selected from the group consisting of anionic surfactants, non-ionic surfactants, and combinations of the same. In certain aspects, where the surfactant is an anionic surfactant selected from the group consisting of sodium dodecylbenzene sulfonate, sodium lauryl sulfonate, a sulfate salt of a nonylphenol ethoxylate containing 20-40 moles of ethylene oxide. In certain aspects, the surfactant is a non-ionic surfactant, where the non-ionic surfactant is a nonylphenol ethoxylates containing 20-40 moles of ethylene oxide. In certain aspects, the composition further includes a latex additive.

In a second aspect, a composition for use as a cement slurry composition in downhole cementing applications is provided. The composition includes a latex cement additive, the latex cement additive includes an aqueous latex, the aqueous latex includes an aqueous fluid and a solid elastomer dispersed in the aqueous fluid, a liquid elastomer having a viscosity between 50,000 cP and 300,000 cP at room temperature, and a surfactant operable to facilitate incorporation of the liquid elastomer. The composition further includes a cement composition operable to hardened into a set cement, the cement composition includes a cement and water.

In certain aspects, the cement is selected from the group consisting of Portland cements, high alumina cements, magnesia cements, pozzolanic cements, and slag cements. In certain aspects, the composition further includes a cement additive selected from the group consisting of a cement dispersant, set retarders or accelerators, fluid loss control agents, gas migration control additives, settling prevention addition additives, strength retrogression prevention additives, mechanical property modifiers, fibers, foaming agents, defoamer additives, and combinations of the same.

In a third aspect, a method of making a cement slurry composition is provided. The method includes the steps of adding an amount of a liquid elastomer to an aqueous latex to produce a latex cement additive, mixing the latex cement additive, such that the liquid elastomer forms a dispersed phase in the aqueous fluid, adding an amount of a latex cement additive to a cement composition, and mixing the latex cement additive into the cement composition to form the cement slurry composition.

In certain aspects, the method further includes the steps of adding an amount of a cement to water to produce the cement composition, and mixing the cement composition.

In a fourth aspect, a method of using a cement slurry composition in a downhole application in a wellbore is provided. The method includes the steps of adding an amount of a liquid elastomer to an aqueous latex to produce a latex cement additive, mixing the latex cement additive, such that the liquid elastomer forms a dispersed phase in the aqueous fluid, adding an amount of the latex cement additive to a cement composition, mixing the latex cement additive into the cement composition to form the cement slurry composition, introducing the cement slurry composition to a wellbore, and allowing the cement slurry composition to harden into a set cement.

In certain aspects, the downhole application is selected from the group consisting of primary cementing operations, annulus sealing operations, and combinations of the same.

BRIEF DESCRIPTION OF THE DRAWINGS

These and other features, aspects, and advantages of the scope will become better understood with regard to the following descriptions, claims, and accompanying drawings. It is to be noted, however, that the drawings illustrate only several embodiments and are therefore not to be considered limiting of the scope as it can admit to other equally effective embodiments.

FIG. 1 provides a Thermogravimetric Analysis (TGA) graph of the aqueous latex additive of Example 1.

In the accompanying FIGURES, similar components or features, or both, may have a similar reference label.

DETAILED DESCRIPTION

While the scope of the apparatus and method will be described with several embodiments, it is understood that one of ordinary skill in the relevant art will appreciate that many examples, variations and alterations to the apparatus and methods described here are within the scope and spirit of the embodiments.

Accordingly, the embodiments described are set forth without any loss of generality, and without imposing limitations, on the embodiments. Those of skill in the art understand that the scope includes all possible combinations and uses of particular features described in the specification.

The compositions and methods are directed to compositions of latex cement additives. The latex cement additives provide a method for adding a liquid elastomer to cement compositions, where the liquid elastomers alone or in pure form are not pourable and cannot be mixed with cement compositions.

Advantageously, the latex cement additives described here enhance the mechanical properties of the cement, such as by lowering the elastic modulus, improving the tensile strength, and improving the compressive strength. Lowering the elastic modulus of cement reduces the cement brittleness, which is an advantage in cementing zones that produce gas with gas flow potentials and formation gas pressures in ranges that can cause concern for production. Advantageously, the liquid elastomer in the latex cement additive can flow into cracks and fractures in the cement, such as cracks in the cement column, microannulus at the casing to cement interface, and microannulus at the cement to cement interface in a crack. Advantageously, the liquid elastomer in the latex cement additive can absorb and dissipate imposed stresses better than solid elastomers. Advantageously, the elastomer content of latex cement additives add stress-resistant properties and self-sealing properties to set cement. Stress-resistance improves the life of the set cement under the downhole conditions due to the stresses placed on the set cement due to the pressure conditions in the well, including the changing pressure conditions during the course of production. Self-sealing properties enables set cement to maintain or retain the stress-resistance and flow blocking abilities in the event of a fracture or crack in the cement; in some instances the presence of the latex cement additives can seal or close those fractures or cracks. Advantageously, the latex cement additives can provide fluid loss and gas migration control, while improving the mechanical properties of a set cement. The set cement can provide stress-resistance and impact-resistance while providing zonal isolation. Advantageously, the latex cement additives can have self-healing properties.

As used throughout, "latex" refers to an aqueous emulsion of a dispersed solid polymer phase.

As used throughout, "liquid elastomer" refers to low molecular weight polymers which are liquid at room temperature with viscosities in the range from 50,000 cP to 300,000 cP at room temperature, alternately between 100,000 cP and 300,000 cP, alternately between 200,000 cP, and alternately between 100,000 cP and 200,000 cP. The liquid elastomer contains only elastomer and does not contain water or an aqueous fluid. The low molecular weight polymers can have molecular weights in the range of 1,000 to 250,000 Daltons (Da) and exist in liquid state at room temperature. The low molecular weight polymers can include butadiene monomer and combinations of butadiene monomer and between one and three additional monomers. In at least one embodiment, the low molecular weight polymer is a homopolymer including butadiene monomer alone. In at least one embodiment, the low molecular weight polymer is a copolymer including butadiene and between one and three additional monomers. The additional monomers in the copolymer can be incorporated into the backbone of the polymer chain or grafted onto the polymer backbone. For example, the butadiene monomer can polymerize by 1,4 addition during chain growth, leading to liquid elastomers containing 2-butene groups, alternately the butadiene monomer can polymerize by 1,2-addition during chain growth, leading to liquid elastomers containing vinyl groups. Examples of the additional monomers can include polar monomers, non-polar monomers, and combinations of the same. Examples of polar monomers can include acrylonitrile, maleic anhydride, vinyl acetate, and combinations of the same. Examples of non-polar monomers can include styrene, alpha-methylstyrene, propylene, and combinations of the same. The low molecular weight polymers can be chain-end terminated with polar functional groups. Examples of polar functional groups can include amino groups, carboxylate groups, hydroxyl groups, carboxy anhydride groups, ester groups, sulfonate groups, phosphonate groups, and combinations of the same. The polar groups from the polar monomers and polar functional groups are capable of binding with or adsorbing onto cement surfaces. The polar groups from the polar monomers and polar functional groups can have a binding affinity for polyvalent metal ions and hydroxyl groups present in the cement and subterranean formation surfaces. Examples of polyvalent metal ions can include calcium, magnesium, aluminum, and combinations of the same. Examples of the hydroxyl groups can include silanol groups with the form R—Si—OH. Due to the polar groups, the liquid elastomers can adhere to metal surfaces, cement surfaces, and both metal and cement surfaces.

The latex cement additive described here include an aqueous latex, a liquid elastomer and a surfactant.

The aqueous latex includes an aqueous fluid and a solid elastomer. The aqueous latex can be any type of preformed latex containing the solid elastomer dispersed in the aqueous fluid forming an emulsion. The amount of aqueous fluid in the aqueous latex can be about 50 percent (%) by weight. The aqueous latex can be formed by polymerization of monomers in an emulsion polymerization process, where the polymerization of monomers forms the dispersed solid elastomer. The aqueous fluid is pure water.

The solid elastomer can be any film forming elastomer containing butadiene monomers, styrene monomers, acrylonitrile monomers, ethylene monomers, vinyl acetate monomers, and combinations of the same. In at least one embodiment, the solid elastomer includes butadiene monomer, styrene monomer, acrylonitrile monomer, and combinations of the same. In at least one embodiment, the solid elastomer includes a combination of ethylene monomer and vinyl acetate monomer. The ratio of the different monomers can vary depending on the solid elastomer. The solid elastomer can also include a polar monomer in an amount between 1% by weight and 10% by weight. Examples of polar monomers include acrylic acid salt and 2-acrylamide-2-methyl propane sulfonic acid salt. The polar monomer can be present to reinforce the stability of the emulsion of the aqueous latex. Advantageously, film forming elastomers can have gas migration control and fluid loss control.

The aqueous latex can be a commercially available aqueous latex. Examples of commercially available aqueous latexes can include styrene-butadiene latexes, acrylonitrile butadiene latexes, and polyvinyl acetate latexes. Commercially available styrene-butadiene latexes typically have proprietary monomer ratios.

In some embodiment, the aqueous latex can include a latex additive. Examples of latex additives can include stabilizing surfactants, rheology modifiers, viscosifiers, and combinations of the same. The latex additive can be present in the aqueous latex in an amount of about 10% by weight.

The surfactant can be any type of surfactant capable of facilitating the incorporation of the liquid elastomer in the aqueous latex and stabilizing the latex cement additive. Examples of the surfactant can include anionic surfactants, non-ionic surfactants and combinations of the same. Examples of anionic surfactants can include sodium dodecylbenzene sulfonate, sodium lauryl sulfonate, a sulfate salt of a nonylphenol ethoxylate containing 20-40 moles of ethylene oxide, and combinations of the same. Examples of the non-ionic surfactants can include a nonylphenol ethoxylate containing 20-40 moles of ethylene oxide.

The latex cement additive can be formed by adding the liquid elastomer and surfactant to the aqueous latex. The liquid elastomer and surfactant can be mixed in one step or added separately. In at least one embodiment, the surfactant is added first, followed by the liquid elastomer with vigorous stirring. Adding the surfactant first can result in a better dispersion of the mixture. In at least one embodiment, the mixture can be heated to a temperature of greater than 140 deg F. and alternately a temperature between 140 deg F. and 180 deg F. Heating the mixture can accelerate the dispersion of the liquid elastomer in the aqueous latex. The components can be mixed until the liquid elastomer is incorporated into the aqueous latex forming a stable emulsion. A stable emulsion is achieved when the mixture does not phase separate into an aqueous phase and non-aqueous phase for at least 24 hours. The components can be mixed for a time between 2 hours and 24 hours. In at least one embodiment, the latex cement additive can be an emulsion, where the liquid elastomer is incorporated into the dispersed phase with the solid elastomer. In at least one embodiment, the latex cement additive can be an emulsion, where the liquid elastomer is incorporated into the aqueous latex as an internal phase separate from the dispersed solid elastomer. In at least one embodiment, the dispersed phase can reach a total volume fraction of between 70 percent and 75 percent of the latex cement additive.

Cement slurry compositions can include the latex cement additives and a cement composition. The cement composition can include a cement and water. The cement can be any cement capable of being used in downhole applications. Examples of cements can include Portland cements, high alumina cements, magnesia cements, pozzolanic cements, and slag cements. In at least one embodiment, the cement is a Portland cement, and the Portland cement is a Class G cement. The cement slurry composition can include cement additives. Examples of cement additives include a cement dispersant, set retarders or accelerators, fluid loss control agents, gas migration control additives, settling prevention addition additives, strength retrogression prevention additives, mechanical property modifiers, fibers, foaming agents, defoamer additives, and combinations of the same.

In at least one embodiment, the latex cement additives can be mixed with the water prior to the cement being mixed with the water to produce the cement slurry composition. In at least one embodiment, the latex cement additives can be mixed with the cement composition. Cement additives that are solid additives can be dry blended with the cement prior to the cement being added to the water and alternately water containing the latex cement additives.

The amount of each component of the cement slurry composition can be determined based on the down hole conditions, including the temperature, formation pressure and fracture gradient of the formation. Additionally, the amount of each component of the cement slurry composition can be determined based on whether the slurry is the lead of the slurry column or the tail of the slurry column.

The cement slurry compositions can be used in downhole applications. Examples of downhole applications include primary cementing operations and annulus sealing operations. Annulus sealing operations can include sealing an annulus between a casing and a formation, alternately between two casings, and alternately between a casing and a liner.

EXAMPLES

Example 1

In Example 1, Samples 1-3 were formulations of the latex cement additive and Sample 4 was a comparative example. The aqueous latexes tested were commercially available: Verilok 552 (formerly Genceal CM 8400) available from OMNOVA SOLUTIONS (Beachwood, Ohio), a sulfonated styrene butadiene latex; Latex 2000 available from Halliburton (Houston, Tex.) a carboxylated styrene butadiene elastomer latex; and TYLAC® 4901 available from Mallard Creek Polymers (Charlotte, N.C.) a carboxylated styrene butadiene elastomer latex. Each of the aqueous latexes contained about 40% by weight dispersed solid elastomer, about 10% non-elastomer proprietary components, such as surfactants, and about 50% water. The emulsifier was Latex Stabilizer-RS from RITEKS Corporation (McKinney, Tex.), an anionic emulsifier. The liquid elastomer was a polybutadiene chain-end terminated with carboxylate groups having a molecular weight of 4300 Da.

The samples were created by adding the emulsifier, according to Table 1, and stirring. The liquid elastomer was added with a spatula in an amount according to Table 1. The resulting mixture was stirred for 2 hours until the liquid elastomer was dispersed or emulsified uniformly.

TABLE 1

Formulations of Samples 1-3

| Sample | Aqueous Latex | Emulsifier | Liquid Elastomer |
|---|---|---|---|
| Sample 1 | Verilok 552 - 102.4 grams (g) | 5 milliliters (mL) (5% by weight) | 11.0 g (10-12% by weight) |
| Sample 2 | Latex 2000 - 102.4 g | 5 mL (5% by weight) | 11.0 g (10-12% by weight) |
| Sample 3 | Tylac 4901 - 102.4 g | 5 mL (5% by weight) | 11.0 g (10-12% by weight) |

After stirring for 2 hours, no non-emulsified liquid elastomer was observed in Sample 1. Similar results were observed in Samples 2 and 3, no non-emulsified liquid elastomer was observed after stirring. Thermal gravimetric analysis was used to analyze the solid content of Sample 1. As can be seen in FIG. 1, the thermal gravimetric analysis showed a total polymer concentration in the latex cement additive of about 58% by weight of the latex cement additive. In contrast, the Verilok 552 sample, without the liquid elastomer, contained about 40% elastomer. The results indicate the latex cement additive contained about 18% liquid elastomer emulsified in the aqueous latex. The samples were allowed to sit statically for 6 months and no phase separation was observed, indicating the latex cement additive was stable.

Sample 4 was a comparative example that included water in place of the aqueous latex. The same emulsifier and liquid elastomer as used in Samples 1-3 were used in Sample 4. Five mL of Latex Stabilizer-RS emulsifier was mixed with 95 mL of water and stirred. Eleven g of the liquid elastomer was added to the mixture and stirring continued. Even after a prolonged period of 76 hours of vigorous stirring, the mixture was milky and had large lumps of the liquid elastomer, with the liquid elastomer forming an emulsified elastomer phase. Upon storage under static conditions, the emulsified elastomer phase separated from the water and formed a sticky layer on top of the emulsion. In an additional step, the commercially available aqueous latex, Verilok 552 was added in increasing amounts up to 25 mL aliquots to the phase separated emulsion and stirred, but the phase separated mixture did not emulsify the liquid elastomer. When compared to Samples 1-3, it appears that the liquid elastomer must be added to the aqueous latex for effective emulsification.

Example 2

Example 2 was a study of the latex cement additive in cement compositions. The cement in Example 2 was a class G Portland cement from Saudi Arabia. The aqueous latex was Latex 2000 available from Halliburton (Houston, Tex.). The surfactant was Stabilizer 434B Latex Stabilizer available from Halliburton (Houston, Tex.). The defoamer additive was D-Air 3000 available from Halliburton (Houston, Tex.). The cement dispersant was CFR-3 available from Halliburton Energy Services (Houston, Tex.).

Sample 5 of Example 2 was a comparative sample containing a 16.0 pounds per gallon (ppg) cement composition containing the cement and water. Sample 1 was prepared according to API Recommended Practice 10B-2.

Sample 6 was a comparative sample containing a 16.0 ppg cement formulation containing the cement (1600 g), water (670 mL), the cement dispersant, the aqueous latex (Latex 2000-140 g), the surfactant (10 mL), and the defoamer additive (3 mL). The content of solid elastomer in the cement formulation was 4% by weight of cement. Sample 6 was prepared by addition of the defoamer, aqueous latex, and the surfactant to mix water in a Waring blender while stirring at 1000 revolutions per minute (rpm). In a next step, the cement and the cement dispersant were mixed into the fluid. The cement formulation was then cured at 180 degrees Fahrenheit (deg F.) in an autoclave under a pressure of 3000 pounds per square inch (psi) for 76 hours.

Sample 7 was a 16.0 ppg cement slurry containing the cement (1600 g), water (670 mL), the cement dispersant, the latex cement additive, the surfactant (10 mL), and the defoamer additive (3 mL). The latex cement additive of Sample 7 was prepared by mixing the liquid elastomer, the polybutadiene chain-end terminated with carboxylate groups from Example 1, with the aqueous latex, Latex 2000, to produce a latex cement additive having a concentration of 60% by weight of the latex cement additive as described in Example 1. Sample 7 was prepared by addition of the defoamer, latex cement additive, and the surfactant to mix water in a Waring blender while stirring at 1000 revolutions per minute (rpm). In a next step, the cement and the cement dispersant were mixed into the fluid to produce the cement slurry. The amount of total elastomer in the cement slurry was 4% by weight of cement (% bwoc). The cement slurry was poured into 1.5 inch by 9 inch steel molds and then cured at 180 degrees Fahrenheit (deg F.) in an autoclave under a pressure of 3000 pounds per square inch (psi) for 76 hours. The steel molds produced cylindrical samples, which were cut into 1.5 inch by 3 inch cylinders for use in the compressive strength measurements and 1.5 inch by 1 inch cylinders for use in the tensile strength measurements.

The tensile strength of each sample was measured by the Brazilian Split Cylinder test and the compressive strength was measured on Forney equipment under a load rate of 336 pounds force per second. The results of the tests are shown in Table 2.

TABLE 2

Results of tests in Example 2.

| | Liquid Elastomer/Solid Elastomer (% bwoc) | Total Elastomer Content (% bwoc) | Average Tensile Strength, TS (psi) | Average Compressive Strength, CS (psi) | CS to TS ratio |
|---|---|---|---|---|---|
| Sample 5 | 0 | 0 | 660 | 6610 | 10.0 |
| Sample 6 | 0/4 | 4 | 490 | 4880 | 10.0 |
| Sample 7 | 1.75/2.25 | 4 | 620 | 4230 | 6.80 |

The results show that Sample 6 and Sample 7 show decreased compressive strengths due to the reduced brittleness as compared to Sample 5. The further decrease in compressive strength in Sample 7 as compared to Sample 6 indicates a possible lower Young's modulus (YM). Sample 7 shows a tensile strength higher than that for Sample 6. The compressive strength to tensile strength ratio (CS/TS) indicates the beneficial aspects of adding the latex cement additive to cement compositions, where the latex cement additive includes the liquid elastomers containing functional groups capable of bonding with cement. The results of Sample 5 are typical of conventional cement compositions typically having compressive to tensile strength ratios of about 10 or greater. The decreased C/S ratio of Sample 7 would increase the ability of the cement slurry composition of Sample 7 to decrease the susceptibility of the cement slurry composition to tensile failure of the cement sheath under imposed tensile stresses in a wellbore. Imposed tensile stresses can stem from expansion of the casing due to fluid pressure in the wellbore or increase in temperature during the production phase. Sample 7 illustrates the stress-resistant properties of the latex cement additives.

Example 3

In Example 3, four latex cement additives were prepared (Samples 9, 10, 11, and 12), along with a control sample (Sample 8) using the same procedures and components of Example 1. The liquid elastomer in Sample 9 was a polybutadiene chain-end terminated with carboxy groups having a molecular weight of 4300 purchased from Sigma Aldrich Chemical Company (St. Louis, Mo.). The liquid elastomer in Sample 10 was a copolymer of acrylonitrile and butadiene containing 18% by weight acrylonitrile and chain-end terminated with carboxy groups having a molecular weight of 3600 purchased from Sigma Aldrich Chemical Company (St. Louis, Mo.). The liquid elastomer in Sample 11 was a polybutadiene chain-end terminated with hydroxy groups having a molecular weight of 2400 purchased from Sigma Aldrich Chemical Company (St. Louis, Mo.). The liquid elastomer in Sample 12 was a polybutadiene grafted with maleic anhydride containing 13% by weight maleic anhydride and having a molecular weight of 3100, available under the product name Ricon 130MA13 from Cray Valley (Exton, Pa.). Sample 8, the control sample, contained the aqueous latex, but no liquid elastomer. The aqueous latex was a styrene-butadiene latex, available under the name Tylac 4901 from Mallard Creek Polymers (Charlotte, N.C.). For each of samples 9-12, the latex cement additives were prepared by mixing the aqueous latex and the liquid elastomer and heating to a temperature between 140 deg F. and 180 deg F. for 1 to 2 hours followed by stirring the heated mixture for 18 hours to obtain a homogenous stable emulsion. Cement compositions using the latex cement additives were prepared as described in Example 2.

Each cement slurry composition was prepared with 1600 g Class G Portland cement, 670 g water, 140 g of the latex cement additive, 3 mL of a defoamer, 2-ethyl hexanol. Samples 10 and 12 included 10 mL of a stabilizing surfactant, stabilizer 434B from Halliburton (Houston, Tex.). Samples 9 and 11 included an additional 10 g of water, but did not include the stabilizing surfactant. Sample 8 contained 160 g of the aqueous latex and 654 g of water. The density of each cement slurry composition was 15.4 pounds per gallon (ppg). Each cement slurry composition contained 4% total elastomer. The cement slurry compositions were poured into 2 inch by 5 inch steel molds and allowed to cure for 72 hours at 180 deg F. under a pressure of 3000 psi to produce cylinders. The cylinders were cut into 2 inch by 4 inch cylinders for the compressive strength tests and Young's modulus measurements and 2 inch by 1 inch cylinder discs were prepared for the tensile strength measures with the Brazilian Split Cylinder method. The self-sealing ability was determined by wrapping the split halves of the samples from the tensile strength measurements in a piece of aluminum foil, holding the piece together in a C-Clamp and heating the sample at 200 F for 48 hours. The heated samples were cooled and hand pressure was applied on the self-healed sample in an attempt to break the sample. The relative ease with which the sample is split is ranked for all the formulations. The results are shown in Table 2.

TABLE 2

Properties of Samples of Example 3

| | Sample 8 | Sample 9 | Sample 10 | Sample 11 | Sample 12 |
|---|---|---|---|---|---|
| Liquid Elastomer, % bwoc | 0 | 1.75 | 1.75 | 1.75 | 1.75 |
| Solid Elastomer from Latex, % by weight | 4 | 2.25 | 2.25 | 2.25 | 2.25 |
| Total Elastomer, % by weight | 4 | 4 | 4 | 4 | 4 |
| Stabilizing Surfactant, % by weight of mix water | 1.53 | 1.53 | 0 | 0 | 0 |
| Compressive Strength (CS), psi | 4650 | 3840 | 4350 | 4170 | 4470 |
| Tensile Strength (TS), psi | 410 | 380 | 470 | 410 | 370 |
| CS/TS Ratio | 11.0 | 10.0 | 9.0 | 10.0 | 12.0 |
| Young's Modulus (YM), psi | $1.90 \times 10^6$ | $1.48 \times 10^6$ | $1.77 \times 10^6$ | $1.75 \times 10^6$ | $1.29 \times 10^6$ |
| Self-healing ability | Poor | Poor | Poor | Poor | Good |

Although the embodiments have been described in detail, it should be understood that various changes, substitutions, and alterations can be made hereupon without departing from the principle and scope. Accordingly, the scope of the embodiments should be determined by the following claims and their appropriate legal equivalents.

There various elements described can be used in combination with all other elements described here unless otherwise indicated.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed here as from about one particular value to about another particular value and are inclusive unless otherwise indicated. When such a range is expressed, it is to be understood that another embodiment is from the one particular value to the other particular value, along with all combinations within said range.

As used here and in the appended claims, the words "comprise," "has," and "include" and all grammatical variations thereof are each intended to have an open, non-limiting meaning that does not exclude additional elements or steps.

That which is claimed is:

1. A composition for use as a latex cement additive, the composition comprising:
    an aqueous latex, the aqueous latex comprising an aqueous fluid and a solid elastomer, where the solid elastomer is dispersed in the aqueous fluid;
    a liquid elastomer, the liquid elastomer having a viscosity between 50,000 cP and 300,000 cP at room temperature; and
    a surfactant, the surfactant operable to facilitate incorporation of the liquid elastomer into the aqueous latex.

2. The composition of claim 1, where the solid elastomer comprises monomers selected from butadiene monomers, styrene monomers, acrylonitrile monomers, ethylene monomers, vinyl acetate monomers, and combinations of the same.

3. The composition of claim 1, where the liquid elastomer comprises a low molecular weight polymer, where the low molecular weight polymer comprises butadiene.

4. The composition of claim 3, where the low molecular weight polymer comprises polar groups selected from the group consisting of polar monomers, polar functional groups, and combinations of the same.

5. The composition of claim 3, where the low molecular weight polymer comprises polar monomers selected from the group consisting of acrylonitrile, maleic anhydride, vinyl acetate, and combinations of the same.

6. The composition of claim 3, where the low molecular weight polymer comprises the polar functional group selected from the group consisting of carboxylate groups, hydroxyl groups, carboxy anhydride groups, ester groups, sulfonate groups, phosphonate groups, and combinations of the same.

7. The composition of claim 1, where the surfactant is selected from the group consisting of anionic surfactants, non-ionic surfactants, and combinations of the same.

8. The composition of claim 7, where the surfactant is an anionic surfactant selected from the group consisting of sodium dodecylbenzene sulfonate, sodium lauryl sulfonate, a sulfate salt of a nonylphenol ethoxylate containing 20-40 moles of ethylene oxide.

9. The composition of claim 7, where the surfactant is a non-ionic surfactant, where the non-ionic surfactant is a nonylphenol ethoxylates containing 20-40 moles of ethylene oxide.

10. The composition of claim 1, further comprising a latex additive.

\* \* \* \* \*